(12) United States Patent
Aggarwal et al.

(10) Patent No.: US 12,354,101 B2
(45) Date of Patent: Jul. 8, 2025

(54) SYSTEMS AND METHODS FOR PROVIDING IN-PERSON STATUS TO A USER DEVICE

(71) Applicant: Capital One Services, LLC, McLean, VA (US)

(72) Inventors: Karn Aggarwal, Arlington, VA (US); Julian van Giessen, Vero Beach, FL (US); Keith Walker, Austin, TX (US); Galit Ronen, Monroe Township, NJ (US); Anthony Petrucci, Hockessin, DE (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 48 days.

(21) Appl. No.: 17/313,102

(22) Filed: May 6, 2021

(65) Prior Publication Data

US 2022/0358503 A1 Nov. 10, 2022

(51) Int. Cl.
| | |
|---|---|
| *G06Q 20/40* | (2012.01) |
| *G06Q 20/32* | (2012.01) |
| *G06Q 20/38* | (2012.01) |
| *G06Q 20/42* | (2012.01) |
| *G06Q 30/0601* | (2023.01) |

(52) U.S. Cl.
CPC ..... *G06Q 20/4014* (2013.01); *G06Q 20/3223* (2013.01); *G06Q 20/382* (2013.01); *G06Q 20/42* (2013.01); *G06Q 30/0623* (2013.01)

(58) Field of Classification Search
CPC ........ G06Q 20/4014; G06Q 20/00–425; H04L 9/00–50
USPC .......................................................... 705/75
See application file for complete search history.

(56) References Cited

U.S. PATENT DOCUMENTS

| | | | |
|---|---|---|---|
| 9,819,648 B1 * | 11/2017 | Chilakapati | H04L 63/045 |
| 10,163,124 B2 | 12/2018 | Horowitz et al. | |
| 10,552,637 B1 * | 2/2020 | Phillips | G06Q 40/06 |
| 10,803,435 B2 | 10/2020 | Nelms et al. | |
| 2007/0192183 A1 * | 8/2007 | Monaco | G06Q 30/0226 |
| | | | 705/14.27 |
| 2011/0251892 A1 * | 10/2011 | Laracey | G06Q 20/20 |
| | | | 705/16 |
| 2012/0191817 A1 * | 7/2012 | Sayan | G06Q 30/0639 |
| | | | 709/219 |
| 2012/0203605 A1 | 8/2012 | Morgan et al. | |

(Continued)

*Primary Examiner* — Ari Shahabi
(74) *Attorney, Agent, or Firm* — TROUTMAN PEPPER LOCKE LLP; Christopher J. Forstner; John A. Morrissett (57) ABSTRACT

Disclosed embodiments may include a method that includes scanning a machine-readable element, by a second user device, generated by a first user device and embedded with a tracking identifier and a product identifier and recognizing the link embedded in the machine-readable element. Responsive to recognizing the link, the method may include transmitting, by the second user device, a verification request to acquire the product to a server, wherein the verification request comprises the tracking identifier and product identifier. Responsive to receiving in-person status credentials at the second user device, the method may include rendering a description of the product on a display of the second user device, receiving a second user input confirming intent to acquire the product, and transmitting, to a server, instructions to acquire the product in response to receiving the first user input.

20 Claims, 4 Drawing Sheets

(56) References Cited

U.S. PATENT DOCUMENTS

| | | |
|---|---|---|
| 2012/0203613 A1 | 8/2012 | Morgan et al. |
| 2012/0203646 A1 | 8/2012 | Morgan et al. |
| 2012/0203662 A1 | 8/2012 | Morgan et al. |
| 2012/0203665 A1 | 8/2012 | Morgan et al. |
| 2012/0203672 A1 | 8/2012 | Morgan et al. |
| 2012/0203673 A1 | 8/2012 | Morgan et al. |
| 2012/0203693 A1 | 8/2012 | Morgan et al. |
| 2012/0203695 A1 | 8/2012 | Morgan et al. |
| 2012/0203696 A1 | 8/2012 | Morgan et al. |
| 2012/0203697 A1 | 8/2012 | Morgan et al. |
| 2016/0342993 A1 | 11/2016 | Morgan et al. |
| 2017/0132594 A1* | 5/2017 | Morgan ............. G06Q 20/4012 |
| 2021/0035086 A1* | 2/2021 | Khan ................... G06Q 20/204 |
| 2024/0070645 A1* | 2/2024 | Dabney ............ G06Q 20/38215 |

* cited by examiner

SYSTEMS AND METHODS FOR PROVIDING IN-PERSON STATUS TO A USER DEVICE

FIELD

The disclosed technology relates to systems and methods for granting in person status to a customer's user device. In particular, the disclosed technology relates to electronically granting a user device with in-person status credentials or in person approval to enable the user to conduct a transaction or acquire a product (e.g. open an credit card account, conduct a transaction, or purchase a product) on the user device with in-person perks.

BACKGROUND

Customers demand ways to acquire products (e.g., open accounts, conduct transactions, purchase a product or service) using their own device at brick-and-mortar merchant and bank branches. While customers can acquire products online using their mobile device, merchants or banks typically do not offer any in-person benefits to online customers. In addition, during a pandemic such as the coronavirus pandemic, customers may wish to use their own device to acquire products to keep their distance from merchant or bank employees as recommended by the Centers for Disease Control and Prevention recommendations. Moreover, merchants or banks typically perform an additional layer of fraud detection on customers attempting to acquire products online than for customers that have been verified in-person.

Accordingly, there is a need for securely enabling a customer's user device to be given in-person status credentials to enable a customer the ability to acquire a product with in-person perks and in some instances streamline fraud prevention systems by merchants and banks. Embodiments of the present disclosure are directed to this and other considerations.

SUMMARY

Disclosed embodiments may include a system for assigning in-person status to a remote second user in one aspect. The system may include a first user device that includes a first user device display, one or more first processors, and a first memory in communication with the one or more first processors and storing first instructions that are configured to cause the system to perform a method for granting in-person status credentials to the remote second user. For example, the first user device may receive a first user input from a first user corresponding to selecting a product for a second user. The first user device may also send a tracking identifier request for a tracking identifier from a server, the tracking identifier may include a first user identifier associated with the first user and a location identifier associated with the location of the first user device. The first user device may receive the tracking identifier from the server. The first user device may also generate a link embedded with the tracking identifier and the location identifier. The first user device may also generate a machine-readable element embedded with the link. The first user device may render the machine-readable element on the employee computing device display.

The system may also include a server that includes one or more second processors, a second memory in communication with the one or more second processors and storing second instructions that are configured to cause the system to continue to perform the method for granting in-person status credentials to the remote second user. For example, the server may receive the tracking identifier request. The server may also generate the tracking identifier associated with the first user identifier and the location identifier. The server may also send the tracking identifier to the first user device. The server may receive a verification request for in-person status for acquiring the product from a second user device, the verification request comprising the tracking identifier and the product identifier. The server may also determine whether the verification request to acquire the product is a first verification request associated with the first user identifier, the product identifier, the location identifier, and the second user identifier associated with the remote second user. The server may also determine whether the verification request to acquire the product is received within a predetermined time threshold since the tracking identifier was generated. The server may also transmit an alert to the remote second user device that the link has expired in response to determining that the request is not the first verification request or the verification request is not received within the predetermined time threshold. Similarly, the server may transmit in-person status credentials to the second user device in response to determining that the verification request is a first verification request and the verification request is received within the predetermined time threshold.

The system may also include the second user device that includes a second user device display, one or more third processors, a third memory in communication with the one or more third processors and storing third instructions that are configured to cause the system to continue to perform the method for granting in-person status credentials to the remote second user. For example, the second user device may scan the machine-readable element and recognize the link embedded in the machine-readable element. The second user device may, responsive to recognizing the link, transmit the verification request for in-person status to acquire the product to the server, wherein the verification request comprises the tracking identifier and the product identifier. The second user device may, responsive to receiving the alert, render the alert on the second user device display. The second user device may, responsive to receiving the in-person status credentials, render a description of the product on the second user device display based on the product identifier; receive a second user input confirming intent to acquire the product; and transmit an acquisition request for the product with the in-person status credentials.

Disclosed embodiments may include another system for assigning in-person status to a remote first user in another aspect. The system may include a first user device including a first user device display, one or more first processors, a first memory in communication with the one or more first processors and storing first instructions that are configured to cause the system to perform a method for granting in-person status credentials to the remote first user. For example, the first user device may scan a machine-readable element generated by a second user device and recognize a link embedded in the machine-readable element, the link embedded with a tracking identifier and a product identifier. The first user device may, responsive to recognizing the link, transmit a verification request to acquire the product to a server, wherein the request comprises the tracking identifier and the product identifier. The first user device may, responsive to receiving an alert, render the alert on the first user device display. The first user device may, responsive to receiving in-person status credentials, render a description of the product on the display based on the product identifier and receive, from the remote first user, a first user input confirming intent of the first user to acquire the product.

The system may also include a server that includes one or more second processors, a second memory in communication with the one or more second processors and storing second instructions that are configured to cause the system to continue to perform the method for granting in-person status credentials to the remote first user. For example, server may receive the verification request to acquire the product from the first user device, the verification request comprising the tracking identifier and the product identifier. The server may also determine whether the verification request to acquire the product is a first request associated with the tracking identifier and the product identifier. The server may also determine whether the verification request to acquire the product is received within a predetermined time threshold since the tracking identifier was generated. The server may also transmit the alert to the first user device that the link has expired in response to determining that the verification request is not the first request or the verification request is received not within the predetermined time threshold. The server may also transmit the in-person status credentials to the first user device in response to determining that the verification request is a first request and the verification request is received within the predetermined time threshold.

Disclosed embodiments may include a user device receiving in-person status for an associated remote user in yet another aspect. The user device may include a display, one or more first processors, memory in communication with the one or more processors and storing first instructions that are configured to cause the system to perform a method for receiving in-person status credentials to the remote user. For example, the user device may scan a machine-readable element generated by an employee device and embedded with a tracking identifier and a product identifier and recognize the link embedded in the machine-readable element. The user device may also transmit a request to acquire the product to a server, wherein the request comprises the tracking identifier and the product identifier. The user device may also render the alert on the display in response to receiving an alert indicating that link has expired. The user device may, responsive to receiving in-person status credentials, render a description of the product on the display, receive a first user input confirming intent to acquire the product, and transmit, to a server, instructions to acquire the product in response to receiving the first user input.

Disclosed embodiments may include yet another system for assigning in-person status to a remote first user in yet another aspect. The system may include a first user device including a first user device display, one or more first processors, a first memory in communication with the one or more first processors and storing first instructions that are configured to cause the system to perform a method for granting in-person status credentials to the remote first user. For example, the first user device may scan a machine-readable element generated by a second user device and recognize a link embedded in the machine-readable element, the link embedded with a tracking identifier and a transaction identifier. The first user device may, responsive to recognizing the link, transmit a verification request to conduct the proposed transaction to a server, wherein the verification request comprises the tracking identifier and the transaction identifier. The first user device may, responsive to receiving an alert, render the alert on the first user device display. The first user device may, responsive to receiving in-person status credentials prompt a first user associated with the first user device for a confirmation to conduct the proposed transaction and responsive to receiving, via user input from the first user, the confirmation to conduct the proposed transaction, complete the proposed transaction.

The system may also include a server that includes one or more second processors, a second memory in communication with the one or more second processors and storing second instructions that are configured to cause the system to continue to perform the method for granting in-person status credentials to the remote first user. For example, server may receive the verification request to acquire the product from the first user device, the verification request comprising the tracking identifier and the transaction identifier. The server may also determine whether the verification request to conduct the proposed transaction is a first verification request associated with tracking identifier and the transaction identifier. The server may also determine whether the verification request to conduct the proposed transaction is received within a predetermined time threshold since the link was generated. The server may also transmit the alert to the first user device that the link has expired in response to determining that the verification request is not the first request or the verification request is received not within the predetermined time threshold. The server may also transmit the in-person status credentials to the first user device in response to determining that the verification request is a first request and the verification request is received within the predetermined time threshold.

Further features of the disclosed design, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

Figure 1A:
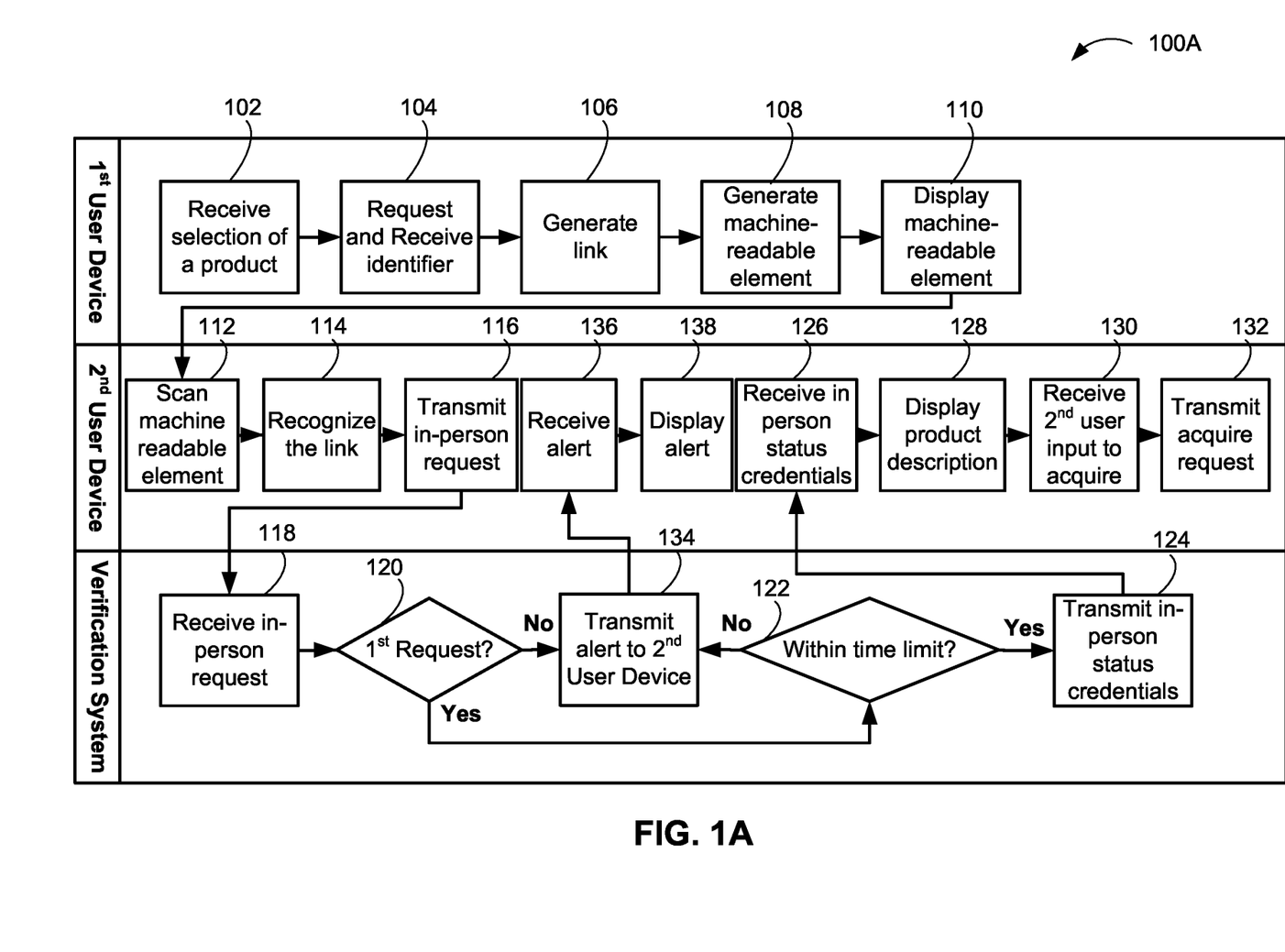
FIG. 1A is a flow diagram illustrating an exemplary method for granting in-person status for acquiring a product, in accordance with certain embodiments of the disclosed technology.

FIG. 1A is a flow diagram illustrating an exemplary method 100A for granting in-person status for acquiring a product, in accordance with certain embodiments of the disclosed technology. The steps of method 100A may be performed by one or more components of the system 300 (e.g., verification system 220 or a web server 310 of an in-person status system 308, first user device 302A, or second user device 302B), as described in more detail with respect to FIGS. 2 and 3.

In block 102, the first user device 302A may receive a first user input from a first user corresponding to selecting a product for a second user. The first user may be an employee of a brick-and-mortar store. The product may be goods (e.g., a new smartphone) or services (e.g., a massage) for purchase. In some embodiments, the product may include a new account (e.g., a new checking account or credit card account) associated with a bank or credit card company and the second user may wish to open the new account.

In block 104, the first user device 302A may request and receive, to and from a verification system 220, a unique tracking identifier associated with the first user, the location of the user first user device 302A, and in some embodiments a time generated from a verification system 220 or a time the request is made to the verification system 220. In some embodiments, the first user device 302A includes a product identifier associated with the selected product in the request for the tracking identifier. The verification system 220 may generate the tracking identifier to associate with the selected product based on the product identifier it receives from the first user device 302A. Regardless, the tracking identifier can be any alphanumeric character string. Similarly, the product identifier may be any alphanumeric character string.

In block 106, the first user device 302A may generate a link (e.g., a uniform resource locator (URL)) embedded with the tracking identifier and the product identifier. For example, the first user device may generate the following link: "capitalone:// bankaccountopening?productId={productId}&trackingId= {trackingId}".

In block 108, the first user device 302A may generate a machine-readable element (e.g., a quick response (QR) code) embedded with the link.

In block 110, the first user device 302A may render the machine-readable element to the employee computing device for display.

In block 112, the second user device 302B may scan the machine-readable element (e.g., a QR code). For example, the second user device 302B may use a native camera software application on the second user device 302B. In some embodiments, the second user may initiate a software application or website associated with the product, which controls a camera on the second user device 302B to scan the machine-readable element within the software application or website associated with the product.

In block 114, the second user device 302B may recognize the link embedded in the machine-readable element.

In block 116, the second user device 302B may transmit a verification request to the server in response to recognizing the link. The verification request may include the tracking identifier and the product identifier.

In block 118, the verification system 220 (also referred to as the server throughout) may receive the verification request to acquire the product from the second user device 302B. For example, the verification system 220 may receive the verification request to open a new account for the second remote user.

In block 120, the verification system 220 may determine whether the verification request to acquire the product is a first request associated with the tracking identifier and the product identifier.

In block 122, the verification system 220 may determine whether the verification request to acquire to the product is received within a predetermined time threshold since the tracking identifier was generated.

In block 124, the verification system 220 may transmit an in-person status credential(s) to the second user device 302B in response to determining that (i) the verification request is the first request and (ii) the verification request is received within the predetermined time threshold since the tracking identifier was generated. If the request is not a first request, then a fraudster could receive a text with the QR code and recognize the QR code to open an account under a different identity. Thus, the two above verification steps help ensure that a person is highly likely physically located at a brick-and-mortar store rather than some remote user.

In block 126, the second user device 302B may receive the in-person status credential(s).

In block 128, the second user device 302B may display a description of the product based on the product identifier and in response to receiving the in-person status credential(s). For example, the second user device may display the description of the new account details the user wishes to open. In some embodiments, the product may be a new bank account and the second user device 302B may also populate any forms associated with opening the new account with data (e.g., home address, phone number, and birthdate) about the user stored on the device to help the user quickly fill out the necessary paperwork to open the new account. To populate the forms for opening a new account, the second user device 302B will determine whether the second user is an existing customer of the bank. When the second user device 302B determines that the second user is an existing customer, the second user device 302B will send a request to a bank server (e.g., verification system 220) for existing information regarding existing customer and prepopulate new account application. As part of the product description displayed by the second user device 302B, the second user device 302B may display a button for the second remote user to confirm his or her intent to acquire the product (e.g., open a new account) and in some instances to confirm that the populated data on the new account forms is correct.

In block 130, the second user device 302B may receive a second user input confirming intent to acquire the product with the in-person status credential(s).

In block 132, the second user device 302B may transmit an acquisition request to the verification system 220 or another related system (e.g., acquisition system 322). The acquisition request may include the in-person status credential(s), especially if the request is sent to another related system. In some embodiments, the in-person status credential(s) are associated with a discount. The second user device 302B may be able to apply the discount at check out. Otherwise, the verification system 220 or server or another system may apply the discount once a full request to acquire the product is submitted by the second user device 302B. In other embodiments, if acquiring the product involves opening an new checking account, the in-person status credential(s) grants the associated user with a priority status for fraud processing such that the verification system 220 or related system may conduct less intensive fraud processing of the user's request for a new account than the verification system 220 or related system would if the user was trying to open an account online. This is because the user has been verified by an employee with the location built into the tracking identifier to be a real person in a real brick-and-mortar store.

In block 132, the verification system 220 may transmit an alert to the second user device 302B informing the second user that the link has expired when the verification system 220 determines that the request is not (i) the first request or (ii) within the predetermined time threshold.

In block 134, the second user device 302B may receive the alert.

In block 136, the second user device 302B may display the alert. For example, the alert may simply state "your link has expired."

In some embodiments, the product corresponds to a new account (e.g., checking account) associated with a financial institution. The in-person status credential(s) may associated with in-person perks and the second user device 302B may display the in-person perks with respect to the new account description on the second user device 302B display. The second user device 302B may transmit an open request to the verification system 220 to open the new account with the in-person perks. In some embodiments, the verification system 220 may receive the open request to open the new account with in-person perks, open the new account based on the open request, and apply the in-person perks to the new account. In some embodiments, the new account includes a credit card account, a checking account, a saving account, a mortgage account, a loan account, or combinations thereof. In some embodiments, the in-person perks comprise a rate discount, a reward point bonus, a bonus deposit, low fees associated with the new account, eliminated fees associated with the new account, or combinations thereof.

In some embodiments, the verification system 220 may direct the second user device 302B display to render a non-personalized product page or section of a software application associated with the product in response to determining that the request is not the first request or the request is not within the predetermined time threshold.

In some embodiments, the first user device may be configured to authenticate the first user by receiving a third user input from the first user corresponding to first identifying information (e.g., username and passcode or biometrics (e.g., fingerprint data, facial recognition data)) associated with the first user, determining whether the first identifying information matches stored first identifying information, authenticating the first user and provide the first user device with access to the first user identifier in response to determining the first identifying information matches the stored first identifying information, displaying on the first user device display a first warning that the first identifying information does not match the stored first identifying information in response to determining the first identifying information does not match the stored first identifying information. The second user device 302B may also be configured to authenticate the second user by receiving a fourth user input from the second user corresponding to second identifying information (e.g., username and passcode or biometrics (e.g., fingerprint data, facial recognition data)) associated with the remote second user, determining whether the second identifying information matches stored second identifying information, authenticating the remote second user and provide the second user device with access to the second user identifier in response to determining the second identifying information matches the stored second identifying information, and displaying on the second user device display a second warning that the second identifying information does not match the stored second identifying information in response to determining the second identifying information does not match the stored second identifying information.

Figure 1B:
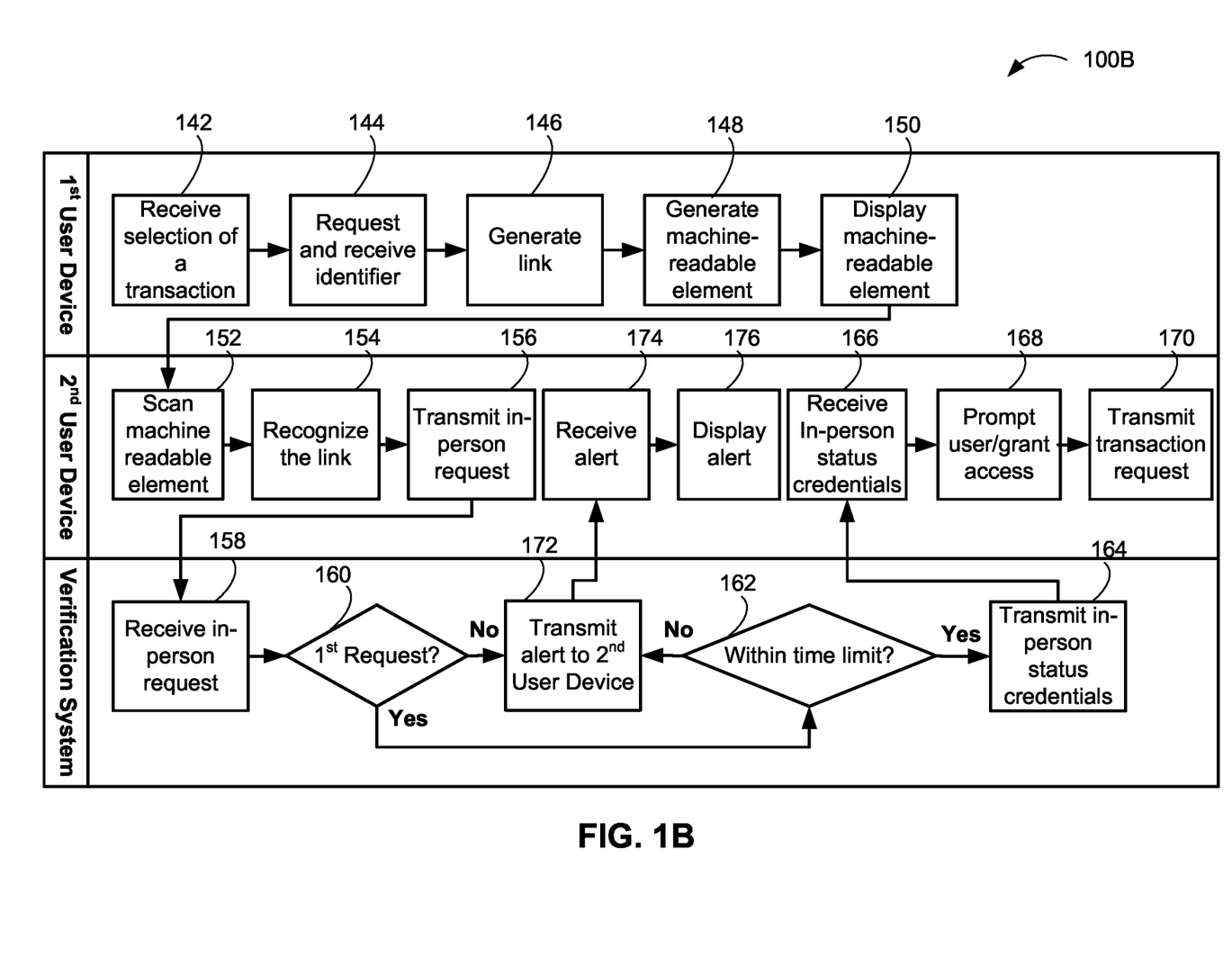
FIG. 1B is a flow diagram illustrating an exemplary method for granting approval for conducting a proposed transaction, in accordance with certain embodiments of the disclosed technology.

FIG. 1B is a flow diagram illustrating an exemplary method for granting approval for conducting a proposed transaction, in accordance with certain embodiments of the disclosed technology. The steps of method 100B may be performed by one or more components of the system 300 (e.g., verification system 220 or a web server 310 of an in-person status system 308, first user device 302A, or second user device 302B), as described in more detail with respect to FIGS. 2 and 3.

Method 100B of FIG. 1B is similar to method 100A of FIG. 1A, except that method 100B may include block 142 in place of blocks 142 and include blocks 168 and 170 in place of blocks 128, 130, and 132. The descriptions of blocks 146, 148, 150, 152, 154, 156, 158, 160, 162, 164, 166, 172, 174, and 176 in method 100B are similar to the respective descriptions of blocks 106, 108, 110, 112, 114, 116, 118, 120, 122, 124, 126, 134, 135, and 138 of method 100A and are not repeated herein for brevity.

In block 142, the first user device 302A may receive a first user input from a first user corresponding to selecting a proposed transaction for a second remote user. The first user may be an employee of a brick-and-mortar store. In some embodiments, the transaction may be a wire transfer from the second remote user's bank account that can only be made in person.

In block 144, the first user device 302A may retrieve a transaction identifier instead of a product identifier described with block 104.

In block 168, the second user device 302B may prompt the second user for a confirmation to conduct the proposed transaction. For example, the second user device may display a button that says confirm transaction. In some embodiments, block 168 may be omitted.

In block 170, the second user device 302B may complete the proposed transaction by communicating with the verification system 220 or another server in response to receiving via user input from the second user that the second remote user confirms intent to conduct the proposed transaction.

In some embodiments, the proposed transaction may be a wire transfer.

Figure 2:
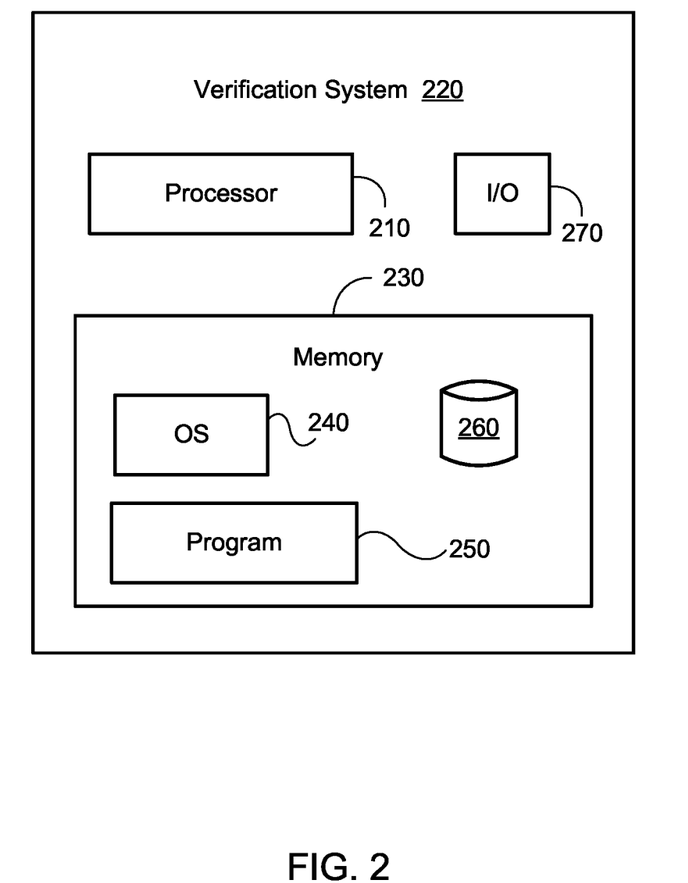
FIG. 2 is a block diagram of an example verification system used to determine whether to grant a user device in-person status for conducting a proposed transaction or acquiring a product, according to an example implementation of the disclosed technology.
Figure 3:
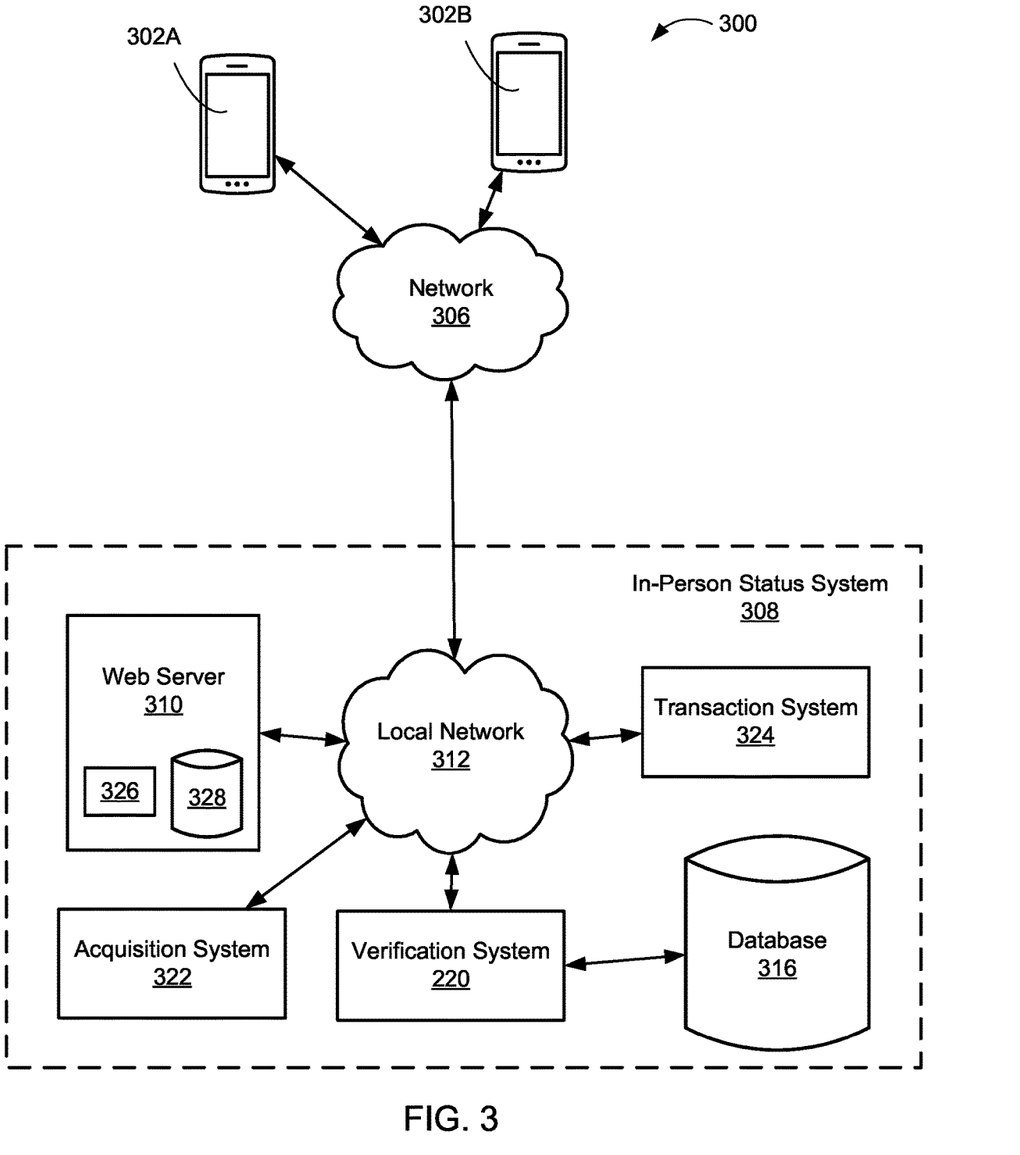
FIG. 3 is a block diagram of an example system that may be used to determine whether to grant a user device in-person status for conducting a proposed transaction or acquiring a product, according to an example implementation of the disclosed technology.

FIG. 2 is a block diagram of an example verification system 220 used to determine whether to grant a user device in-persons status for conducting a proposed transaction or acquiring a product, according to an example implementation of the disclosed technology and as also depicted in FIG. 3. According to some embodiments, the first user device 302A, the second user device 302B, the web server 310, acquisition system 322, transaction system 324 as depicted in FIG. 3 and described below, may have a similar structure and components that are similar to those described with respect to verification system 220 shown in FIG. 2. As shown, the verification system 220 may include a processor 210, an input/output ("I/O") device 270, a memory 230 containing an operating system ("OS") 240 and a program 250. In certain example implementations, the verification system 220 may be a single server or may be configured as a distributed computer system including multiple servers or computers that interoperate to perform one or more of the processes and functionalities associated with the disclosed embodiments. In some embodiments, the verification system 220 may further include a peripheral interface, a transceiver, a mobile network interface in communication with the processor 210, a bus configured to facilitate communication between the various components of the verification system 220, and a power source configured to power one or more components of the verification system 220.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 210 to communicate with other devices via wired or wireless networks, whether local or wide area, private or public, as known in the art. A power source may be configured to provide an appropriate alternating current (AC) or direct current (DC) to power components.

The processor 210 may include one or more of a microprocessor, microcontroller, digital signal processor, co-processor or the like or combinations thereof capable of executing stored instructions and operating upon stored data. The memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 230.

The processor 210 may be one or more known processing devices, such as, but not limited to, a microprocessor from the Pentium™ family manufactured by Intel™ or the Turion™ family manufactured by AMD™. The processor 210 may constitute a single core or multiple core processor that executes parallel processes simultaneously. For example, the processor 210 may be a single core processor that is configured with virtual processing technologies. In certain embodiments, the processor 210 may use logical processors to simultaneously execute and control multiple processes. The processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the verification system 220 may include one or more storage devices configured to store information used by the processor 210 (or other components) to perform certain functions related to the disclosed embodiments. In one example, the verification system 220 may include the memory 230 that includes instructions to enable the processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, the verification system 220 may include a memory 230 that includes instructions that, when executed by the processor 210, perform one or more processes consistent with the functionalities disclosed herein. Methods, systems, and articles of manufacture consistent with disclosed embodiments are not limited to separate programs or computers configured to perform dedicated tasks. For example, the verification system 220 may include the memory 230 that may include one or more programs 250 to perform one or more functions of the disclosed embodiments. For example, in some embodiments, the verification system 220 may additionally manage dialogue and/or other interactions with the customer via a program 250.

The processor 210 may execute one or more programs located remotely from the verification system 220 (such as the system shown in FIG. 3). For example, the verification system 220 may access one or more remote programs, that, when executed, perform functions related to disclosed embodiments.

The memory 230 may include one or more memory devices that store data and instructions used to perform one or more features of the disclosed embodiments. The memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 230 may include software components that, when executed by the processor 210, perform one or more processes consistent with the disclosed embodiments. In some embodiments, the memory 230 may include a verification database 260 for storing related data to enable the verification system 220 to perform one or more of the processes and functionalities associated with the disclosed embodiments.

The verification database 260 may include stored data relating to in-person status credentials, time data related to when a link was generated, and count data related to how may in-person status requests the verification system 220 has received per generated link. According to some embodiments, the functions provided by the verification database 260 may also be provided by a database that is external to the verification system 220, such as the database 316 as shown in FIG. 3.

The verification system 220 may also be communicatively connected to one or more memory devices (e.g., databases) locally or through a network. The remote memory devices may be configured to store information and may be accessed and/or managed by the verification system 220. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The verification system 220 may also include one or more I/O devices 270 that may comprise one or more interfaces for receiving signals or input from devices and providing signals or output to one or more devices that allow data to be received and/or transmitted by the verification system 220. For example, the verification system 220 may include interface components, which may provide interfaces to one or more input devices, such as one or more keyboards, mouse devices, touch screens, track pads, trackballs, scroll wheels, digital cameras, microphones, sensors, and the like, that enable the verification system 220 to receive data from a user (such as, for example, via the first user device 302A or the second user device 302B or another user device).

In example embodiments of the disclosed technology, the verification system 220 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While the verification system 220 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the verification system 220 may include a greater or lesser number of components than those illustrated.

FIG. 3 is a block diagram of an example system that may be used to determine whether to grant a user device in-persons status for conducting a proposed transaction or acquiring a product, according to an example implementation of the disclosed technology. The components and arrangements shown in FIG. 3 are not intended to limit the disclosed embodiments as the components used to implement the disclosed processes and features may vary. As shown, in-person status system 308 may interact with a first user device 302A and a second user device 302B via a network 306. In certain example implementations, the in-person status system 308 may include a web server 310, a local network 312, a verification system 320, a database 316, an acquisition system 322, and a transaction system 324.

In some embodiments, an employee of a merchant or financial institution may operate the first user device 302A and a customer may operate the second user device 302B. The first user device 302A and/or the second user device 302B can include one or more of a mobile device, smart phone, general purpose computer, tablet computer, laptop computer, telephone, PSTN landline, smart wearable device, voice command device, other mobile computing device, or any other device capable of communicating with the network 306 and ultimately communicating with one or more components of the in-person status system 308. In some embodiments, the first user device 302A and/or the second user device 302B may include or incorporate electronic communication devices for hearing or vision impaired users.

Customers may include individuals such as, for example, subscribers, clients, prospective clients, or customers of an entity associated with an organization, such as individuals who have obtained, will obtain, or may obtain a product, service, or consultation from or conduct a transaction in relation to an entity associated with the in-person status system 308. According to some embodiments, the first user device 302A and/or the second user device 302B may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

The network 306 may be of any suitable type, including individual connections via the internet such as cellular or WiFi networks. In some embodiments, the network 306 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 306 may include any type of computer networking arrangement used to exchange data. For example, the network 306 may be the Internet, a private data network, virtual private network using a public network, and/or other suitable connection(s) that enable(s) components in the system 300 environment to send and receive information between the components of the system 300. The network 306 may also include a public switched telephone network ("PSTN") and/or a wireless network.

The in-person status system 308 may be associated with and optionally controlled by one or more entities such as a business, corporation, individual, partnership, or any other entity that provides one or more of goods, services, and consultations to individuals such as customers. The in-person status system 308 may include one or more servers and computer systems for performing one or more functions associated with products and/or services that the organization provides. Such servers and computer systems may include, for example, the web server 310 as well as any other computer systems necessary to accomplish tasks associated with the organization or the needs of customers (which may be customers of the entity associated with the organization). The web server 310 may include a computer system configured to generate and provide one or more websites or application data accessible to customers, as well as any other individuals involved in an organization's normal operations. The web server 310, for example, may include a computer system configured to receive communications from the first user device 302A and/or the second user device 302B via for example, a website, a mobile application, a chat program, an instant messaging program, a voice-to-text program, an SMS message, email, or any other type or format of written or electronic communication. The web server 310 may have one or more processors 326 and one or more web server databases 328, which may be any suitable repository of website data. Information stored in the web server 310 may be accessed (e.g., retrieved, updated, and added to) via the local network 312 (and/or the network 306) by one or more devices (e.g., the verification system 320) of the in-person status system 308.

The local network 312 may include any type of computer networking arrangement used to exchange data in a localized area, such as WiFi, Bluetooth™ Ethernet, and other suitable network connections that enable components of the in-person status system 308 to interact with one another and to connect to the network 306 for interacting with components in the system 300 environment. In some embodiments, the local network 312 may include an interface for communicating with or linking to the network 306. In other embodiments, certain components of the in-person status system 308 may communicate via the network 306, without a separate local network 306.

In accordance with certain example implementations of the disclosed technology, the in-person status system 308 may include one or more computer systems configured to compile data from a plurality of sources, such as the web server 310, the verification system 320, the database 316, the transaction system 324, and/or the acquisition system 322. The verification system 220 may correlate compiled data, analyze the compiled data, arrange the compiled data, generate derived data based on the compiled data, and store the compiled and derived data in a database such as the database 316. According to some embodiments, the database 316 may be a database associated with an organization and/or a related entity that stores a variety of information relating to customers, transactions, and business operations. The database 316 may also serve as a back-up storage device and may contain data and information that is also stored on, for example, databases 328 and 260, as discussed with reference to FIG. 2.

The acquisition system 322 may authorize acquisitions for opening new accounts (e.g., credit card accounts), purchasing products (e.g., groceries) or services based on receiving an acquisition request from a user. For example, a customer In other embodiments, the verification system 220 may facilitate such a process.

The transaction system 324 may authorize transactions related to accounts held by a customer associated with the second user device 302B. For example, if a customer wants to conduct a wire transfer from one of his accounts, banks usually require the customer to have come in person to a branch to conduct the transfer. Using the process described above, the transaction system could authorize such a transfer if it receives in person status credentials with the request to make the wire transfer. In other embodiments, the verification system 220 may facilitate such a process.

Exemplary Use Cases

Sally, a customer, walks into a bank branch and tells an employee, John of Bank ABC that she would like to open a checking account. Sally and John discuss how the new account may be used as well as different checking accounts that may be a good fit for her. Of the options, Sally tells John that she would like to open a no fee checking account. John finds the option for opening the elected a no fee checking account on his tablet (e.g., first user device 302A) and selects it. The tablet (e.g., first user device 302A) retrieves John's identifier made accessible to John's device (e.g., first user device 302A) due to John previously logging in to the tablet (e.g., first user device 302A), and it authenticated him with a username and passcode, facial recognition, fingerprint recognition, etc. The tablet (e.g., first user device 302A) also retrieves a product identifier associated with the elected no fee checking account, and a location identifier associated with the tablet's (e.g., first user device's 302A) location (e.g., global positioning satellite data or internet protocol address). John's tablet (e.g., first user device 302A) send a request for a unique tracking identifier to a server (e.g., verification system 220). The request contains John's identifier and the location identifier associated with the tablet's (e.g., first user device 302A). The server (e.g., verification system 220) then generates a tracking identifier based on John's identifier and location identifier and the time the tracking identifier is generated or a time the request to generate the tracking identifier was received by the server (e.g., verification system 220). The server (e.g., verification system 220) then sends the tracking identifier to John's tablet (e.g., first user device 302A), which receives the tracking identifier. Upon receipt of the tracking identifier, John's tablet (e.g., first user device 302A) generates a link embedded with the tracking identifier and the product identifier (e.g., capitalone://bankaccountopening?productId={productId}&trackingId={trackingId}). John's tablet (e.g., first user device 302A) then generates a machine-readable element (e.g., a QR code) embedded with the link and displays the machine-readable element. John the holds out the tablet (e.g., first user device 302A) for Sally to view.

Sally is carrying her own mobile device (e.g., second user device 302B) and appreciated the bring-your-own technology so she can easily and quickly fill out forms and keep her distance from others during a pandemic. Sally holds her mobile device (e.g., second user device 302B) near the tablet (e.g., first user device 302A) and uses the camera on her mobile device (e.g., second user device 302B) to scan the machine-readable element displayed on John's tablet. Sally's mobile device (e.g., second user device 302B) recognizes the link embedded in the machine-readable element and transmits a verification request for in-person status to open a new no fee checking account to a server (e.g., verification system 220) associated with the bank in response to recognizing the link. The transmitted verification request includes tracking identifier and the product identifier, and a second user identifier associated with Sally and accessible to a software application or website once the software application or website has authenticated her with a user name and password, facial recognition, fingerprint recognition, etc. Sally's authentication may occur prior to scanning the machine-readable element (e.g., when the Sally opens and logs onto the software application associated with the bank).

The server (e.g., verification system 220) associated with Bank ABC may receive Sally's request for in-person status for opening the new no fee checking account from Sally's mobile device (e.g., second user device 302B). The server (e.g., verification system 220) then determines whether the verification request is a first verification request associated with the tracking identifier, the product identifier, and the user identifier associated with Sally. The server (e.g., verification system 220) may search or retrieve information from one or more databases (e.g., databases 260, 316) to help make this determination. If the server (e.g., verification system 220) doesn't find a match off all the identifiers, then the server (e.g., verification system 220) determines that the request is a first verification request. In some embodiments, the server (e.g., verification system 220) may simply search for the tracking identifier in its databases (e.g., databases 260, 316) and determine that the request is a first request if the tracking identifier is not found. However, if the server (e.g., verification system 220) finds a match for all the identifiers (or just the tracking identifier in some cases), then the server (e.g., verification system 220) determines that the verification request is not a first verification request. Additionally, the server (e.g., verification system 220) may determine whether the verification request was received within a predetermined time threshold (e.g., 1 hour) from when the link was generated. The server (e.g., verification system 220) may determine the difference between the time the verification request was received and the time the tracking identifier was generated (information that the server (e.g., verification system 220) may already have stored associated with the tracking identifier or may receive via the tracking identifier because the tracking identifier includes the time and date the tracking identifier was generated) and compare that difference to a predetermined time threshold that may change based on the type of account the user is attempting to open or administrator preference by the bank. For example, if the predetermined time threshold is one hour and only 30 minutes have passed between the tracking identifier being generated and receiving the verification request for in-person status, the server (e.g., verification system 220) determines that the verification request was received within the predetermined time threshold. However, if two hours have passed using the same example, the server (e.g., verification system 220) determines that the verification request was not received within the predetermined time threshold.

When the server (e.g., verification system 220) determines that the verification request is not a first verification request or the verification request is not received within the predetermined time threshold, the server (e.g., verification system 220) transmits an alert to Sally's mobile device (e.g., second user device 302B) explaining that the link has expired. However, when the server (e.g., verification system 220) determines that the verification request is a first request and the request is received within a predetermined time threshold, the server (e.g., verification system 220) transmits in-person status credentials to Sally's mobile device (e.g., second user device 302B).

In this example, the server (e.g., verification system 220) transmits the in-person status credentials to Sally's mobile device (e.g., second user device 302B). Thus, Sally's mobile device (e.g., second user device 302B) received the in-person status credentials rather than receiving and displaying the alert. Once Sally's mobile device (e.g., second user device 302B) receives the in-person status credentials, her mobile device (e.g., second user device 302B) renders a description of the product on the display of her user device (e.g., second user device 302B) based on the product identifier, Sally's mobile device (e.g., second user device 302B) determines that she is an existing customer of ABC bank and requests Sally's contact information for prepopulating one or more forms associated with opening the new account form the server (e.g., verification system 220 or another server associated with ABC bank). Upon receiving the request for contact information about an existing customer that has been authentication, the server (e.g., verification system 220 or another server associated with ABC bank), sends Sally's contact information to Sally's mobile device (e.g., second user device 302B), which automatically pre-populates Sally's contact information on one or more forms for opening the new account since. By using her personal device, Sally can securely expedite data entry rather than having to re-enter it manually on a Bank terminal. Sally presses a button displayed on her mobile device (e.g., second user device 302B) to confirm she wants to open the account and that her information is correct. In response, Sally's mobile device transmits an acquisition request (e.g., a new account application request) with in-person status credentials. The acquisition request includes Sally's contact information and submits Sally's account for opening.

The in-person status credentials may enable the server (e.g., verification system 220) or another server associated with ABC bank to assign Sally a higher status since she is an in-person customer. By doing so, the bank or server (e.g., verification system 220) may perform a less intensive fraud check than it would for a customer who is opening a similar account online. In Sally's case, ABC Bank is offering a $100 deposit to in-person customers who open a no-fee checking account with a $10,000 deposit. Even though Sally used her own device to open an account, her in-person status credentials qualifies Sally for the in-person customer sign-up bonus.

Examples of the present disclosure can be implemented according to at least the following clauses noting that all elements of in clause are not required (i.e., one or more elements may be omitted):

Clause 1: A system for assigning an in-person status to a remote second user, comprising: a first user device comprising: a first user device display; one or more first processors; and a first memory in communication with the one or more first processors and storing first instructions that are configured to cause the first user device to: receive a first user input from a first user corresponding to selecting a product for the remote second user; send a tracking identifier request for a tracking identifier from a sever, the tracking identifier request comprising a first user identifier associated with the first user and a location identifier associated with a location of the first user device; receive the tracking identifier associated with the first user identifier and the location identifier from the server; generate a link embedded with the tracking identifier and a product identifier associated with the product selected by the first user via the first user input; generate a machine-readable element embedded with the link; and render the machine-readable element on the employee computing device display; the server comprising: one or more second processors; and a second memory in communication with the one or more second processors and storing second instructions that are configured to cause the server to: receive the tracking identifier request; generate the tracking identifier associated with the first user identifier and the location identifier; send the tracking identifier to the first user device; receive a verification request for in-person status for acquiring the product from a second user device, the verification request comprising the tracking identifier and the product identifier; determine whether the verification request to acquire the product is a first verification request associated with the tracking identifier and the product identifier; determine whether the verification request to acquire the product is received within a predetermined time threshold since the tracking identifier was generated; responsive to determining that the verification request is not the first verification request or the verification request is not received within the predetermined time threshold, transmit an alert to the remote second user device that the link has expired; and responsive to determining that the verification request is a first verification request and the verification request is received within the predetermined time threshold, transmit in-person status credentials to the second user device; the second user device comprising: a second user device display; one or more third processors; and a third memory in communication with the one or more third processors and storing third instructions that are configured to cause the second user device to: scan the machine-readable element; recognize the link embedded in the machine-readable element; responsive to recognizing the link, transmit the verification request for in-person status to acquire the product to the server, wherein the verification request comprises the tracking identifier and the product identifier; responsive to receiving the alert, render the alert on the second user device display; and responsive to receiving the in-person status credentials: render a description of the product on the second user device display based on the product identifier; receive a second user input confirming intent to acquire the product; and transmit an acquisition request for the product with the in-person status credentials.

Clause 2: The system of clause 1, wherein: the in-person status credentials are associated with a discount; the third instructions are further configured to cause the user device to apply the discount to a purchase of the product; and confirming intent to acquire the product comprises completing a checkout process associated with the product.

Clause 3: The system of any of clauses 1 or 2, wherein the product corresponds to a new account with a financial institution.

Clause 4: The system of clauses 1 to 3, wherein: the in-person status credentials are associated with in-person perks; and the third instructions are further configured to cause the second user device to: display the in-person perks with respect to the new account on the second user device display; and transmit an open request to the server to open the new account with the in-person perks.

Clause 5: The system of clauses 1 to 4, wherein: the second instructions are further configured to cause the server to: receive the open request to open the new account with in-person perks; open the new account based on the open request; and apply the in-person perks to the new account.

Clause 6: The system of clauses 1 to 5, wherein the new account comprises a credit card account, a checking account, a saving account, a mortgage account, a loan account, or combinations thereof.

Clause 7: The system of clauses 1 to 6, wherein the in-person perks comprise a rate discount, a reward point bonus, a bonus deposit, low fees associated with the new account, eliminated fees associated with the new account, or combinations thereof.

Clause 8: The system of clause 1, wherein the second instructions are further configured to cause the server to direct the second user device display to render a non-personalized product page or section of a software application associated with the product in response to determining that the verification request is not the first verification request or the verification request is not within the predetermined time threshold.

Clause 9. The system of clauses 1 to 8, wherein: the first instructions are further configured to cause the first user device to: receive a third user input from the first user corresponding to first identifying information associated with the first user; determine whether the first identifying information matches stored first identifying information; responsive to determining the first identifying information matches the stored first identifying information, authenticate the first user and provide the first user device with access to the first user identifier; and responsive to determining the first identifying information does not match the stored first identifying information, display on the first user device display a first warning that the first identifying information does not match the stored first identifying information; and the third instructions are further configured to cause the second user device to: receive a fourth user input from the second user corresponding to second identifying information associated with the remote second user; determine whether the second identifying information matches stored second identifying information; responsive to determining the second identifying information matches the stored second identifying information, authenticate the remote second user and provide the second user device with access to the second user identifier; and responsive to determining the second identifying information does not match the stored second identifying information, display on the second user device display a second warning that the second identifying information does not match the stored second identifying information.

Clause 10. A system for assigning an in-person status to a remote first user, comprising: a first user device comprising: a first user device display; one or more first processors; and a first memory in communication with the one or more first processors and storing first instructions that are configured to cause the first user device to: scan a machine-readable element generated by a second user device; recognize a link embedded in the machine-readable element, the link embedded with a tracking identifier and a product identifier; responsive to recognizing the link, transmit a verification request to acquire the product to a server, wherein the verification request comprises the tracking identifier and the product identifier; responsive to receiving an alert, render the alert on the first user device display; responsive to receiving in-person status credentials: render a description of the product on the display based on the product identifier; and receive, from the remote first user, a first user input confirming intent of the first user to acquire the product; and the server comprising: one or more second processors; and a second memory in communication with the one or more second processors and storing second instructions that are configured to cause the server to: receive the verification request to acquire the product from the first user device, the verification request comprising the tracking identifier and the product identifier; determine whether the verification request to acquire the product is a first verification request associated with the tracking identifier and the product identifier; determine whether the verification request to acquire the product is received within a predetermined time threshold since the tracking identifier was generated; responsive to determining that the verification request is not the first verification request or the verification request is received not within the predetermined time threshold, transmit the alert to the first user device that the link has expired; and responsive to determining that the verification request is a first verification request and the verification request is received within the predetermined time threshold, transmit the in-person status credentials to the first user device.

Clause 11: The system of clause 10, wherein: the in-person status credentials are associated with a discount; the first instructions are further configured to cause the first user device to apply the discount to a purchase of the product; and the first user input confirming the intent of the remote first user to acquire the product comprises completing a checkout process associated with the product.

Clause 12: The system of clauses 10 and 11, wherein the product corresponds to a new account with a financial institution.

Clause 13: The system of clauses 10 to 12, wherein: the in-person status credentials are associated with in-person perks; and the first instructions are further configured to cause the first user device to: display the in-person perks with respect to the new account on the display; and transmit an open request to the server to open the new account with the in-person perks.

Clause 14: The system of clauses 10 to 13, wherein: the first instructions are further configured to cause the server to: receive the open request to open the new account with in-person perks; open the new account based on the open request; and apply the in-person perks to the new account.

Clause 15: The system of clauses 10 to 14, wherein the new account comprises a credit card account, a checking account, a saving account, a mortgage account, a loan account, or combinations thereof.

Clause 16: The system of clauses 10 to 15, wherein the in-person perks comprise a rate discount, a reward point bonus, a bonus deposit, low fees associated with the new account, eliminated fees associated with the new account, or combinations thereof.

Clause 17: The system of clauses 10 to 16, wherein the first instructions are further configured to cause the server to direct the display of the first user device to render a non-personalized product page or section of a software application associated with the product in response to determining that the verification request is not the first verification request or the verification request is not within the predetermined time threshold.

Clause 18: The system of clauses 10 to 19, wherein the first instructions are further configured to cause the first user device to: receive a second user input from the remote first user corresponding to first identifying information associated with the remote first user; determine whether the first identifying information matches stored first identifying information; responsive to determining the first identifying information matches the stored first identifying information, authenticate the remote first user and provide the first user device with access to the first user identifier; and responsive to determining the first identifying information does not match the stored first identifying information, display on the first user device display a warning that the first identifying information does not match the stored first identifying information.

Clause 19: A user device comprising: a display; one or more processors; and memory in communication with the one or more processors and storing instructions that are configured to cause the user device to: scan a machine-readable element generated by an employee device and embedded with a tracking identifier and a product identifier; recognize the link embedded in the machine-readable element; responsive to recognizing the link, transmit a verification request to acquire the product to a server, wherein the verification request comprises the tracking identifier and a product identifier; responsive to receiving an alert indicating that link has expired, render the alert on the display; and responsive to receiving in-person status credentials: render a description of the product on the display; receive a first user input confirming intent to acquire the product; and transmit, to a server, instructions to acquire the product in response to receiving the first user input.

Clause 20: The user device of clause 19, wherein the instructions are further configured to cause the user device to render a non-personalized product page or section of an application associated with the product in response to receiving the alert.

Clause 21: A system for conducting an in-person transaction with a first user device, comprising: the first user device comprising: a first user device display; one or more first processors; and a first memory in communication with the one or more first processors and storing first instructions that are configured to cause the first user device to: scan a machine-readable element generated by a second user device; recognize a link embedded in the machine-readable element, the link embedded with a tracking identifier and a transaction identifier; responsive to recognizing the link, transmit a verification request to conduct the proposed transaction to a server, wherein the verification request comprises the tracking identifier and the transaction identifier; responsive to receiving an alert that the link has expired, render the alert on the display; responsive to receiving the in-person status credentials to conduct the proposed transaction: prompt a first user associated with the first user device for a confirmation to conduct the proposed transaction; and responsive to receiving, via user input from the first user, the confirmation to conduct the proposed transaction, complete the proposed transaction; and the server comprising: one or more second processors; and a second memory in communication with the one or more second processors and storing second instructions that are configured to cause the server to: receive the verification request to conduct the proposed transaction from the first user device, the verification request tracking identifier and the transaction identifier; determine whether the verification request to conduct the proposed transaction is a first verification request associated with tracking identifier and the transaction identifier; determine whether the verification request to conduct the proposed transaction is received within a predetermined time threshold since the tracking identifier was generated; responsive to determining that the verification request is not the first verification request or the verification request is not received within the predetermined time threshold, transmit the alert to the user device that the link has expired and that the proposed transaction cannot be completed; and responsive to determining that the verification request is a first verification request and the verification request is received within the predetermined time threshold, transmit in-person status credentials to the first user device for conducting the proposed transaction.

The system of clause 21, wherein the proposed transaction is a wire transfer.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for assigning an in-person status to a mobile user, comprising:
   an employee computing device comprising:
   an employee computing device display;
   one or more first processors; and
   a first memory in communication with the one or more first processors and storing first instructions that are configured to cause the employee computing device to:
     receive a first user input from an employee user corresponding to selecting a product for the mobile user, wherein selecting the product comprises selecting a new financial account to open;
     responsive to receiving the first user input:
       send a tracking identifier request for a tracking identifier to a server, the tracking identifier request comprising a first user identifier associated with the employee user and a location identifier associated with a location of the employee computing device;
       receive the tracking identifier associated with the first user identifier and the location identifier from the server;
       generate a link embedded with the tracking identifier and a product identifier associated with the new financial account selected by the employee user via the first user input;
       generate a machine-readable element embedded with the link; and
       render the machine-readable element on the employee computing device display;
   the server comprising:
     one or more second processors; and
     a second memory in communication with the one or more second processors and storing second instructions that are configured to cause the server to:
       receive the tracking identifier request;
       generate the tracking identifier associated with the first user identifier and the location identifier;
       send the tracking identifier to the employee computing device;
       receive a verification request for in-person status for acquiring the product from a mobile user device, the verification request comprising the tracking identifier and the product identifier;
       determine whether the verification request to acquire the product is a first verification request associated with the tracking identifier and the product identifier associated with the new financial account;
       determine whether the verification request to acquire the product is received within a predetermined time threshold since the tracking identifier was generated;
       responsive to determining that the verification request is not the first verification request or the verification request is not received within the predetermined time threshold, transmit an alert to the mobile user device that the link has expired; and
       responsive to determining that the verification request is a first verification request and the verification request is received within the predetermined time threshold, transmit in-person status credentials to the mobile user device;
   the mobile user device comprising:
     a mobile user device display;
     one or more third processors; and
     a third memory in communication with the one or more third processors and storing third instructions that are configured to cause the mobile user device to:
       scan the machine-readable element;

recognize the link embedded in the machine-readable element;

responsive to recognizing the link, transmit the verification request for in-person status to acquire the product to the server, wherein the verification request comprises the tracking identifier and the product identifier;

responsive to receiving the alert, render the alert on the mobile user device display; and responsive to receiving the in-person status credentials:

render a description of the product on the mobile user device display based on the product identifier;

receive a second user input confirming intent to acquire the product; and transmit an acquisition request for the product with the in-person status credentials.

2. The system of claim 1, wherein:

the in-person status credentials are associated with a discount;

the third instructions are further configured to cause the mobile user device to apply the discount to a purchase of the product; and confirming intent to acquire the product comprises completing a checkout process associated with the product via the mobile user device.

3. The system of claim 1, wherein:

the in-person status credentials are associated with in-person perks; and the third instructions are further configured to cause the mobile user device to:

display the in-person perks with respect to the new financial account on the mobile user device display; and transmit an open request to the server to open the new financial account with the in-person perks.

4. The system of claim 3, wherein:

the second instructions are further configured to cause the server to:

receive the open request to open the new financial account with in-person perks;

open the new financial account based on the open request; and apply the in-person perks to the new financial account.

5. The system of claim 4, wherein the new financial account comprises a credit card account, a checking account, a saving account, a mortgage account, a loan account, or combinations thereof.

6. The system of claim 1, wherein:

the first instructions are further configured to cause the employee computing device to:

receive a third user input from the employee user corresponding to first identifying information associated with the employee user;

determine whether the first identifying information matches stored first identifying information;

responsive to determining the first identifying information matches the stored first identifying information, authenticate the employee user and provide the employee computing device with access to the first user identifier; and responsive to determining the first identifying information does not match the stored first identifying information, display on the employee computing device display a first warning that the first identifying information does not match the stored first identifying information; and the third instructions are further configured to cause the mobile user device to:

receive a fourth user input from the mobile user corresponding to second identifying information associated with the mobile user;

determine whether the second identifying information matches stored second identifying information;

responsive to determining the second identifying information matches the stored second identifying information, authenticate the mobile user and provide the mobile user device with access to a second user identifier; and responsive to determining the second identifying information does not match the stored second identifying information, display on the mobile user device display a second warning that the second identifying information does not match the stored second identifying information.

7. The system of claim 1, wherein the machine-readable element comprises a quick response (QR) code.

8. The system of claim 1, wherein the in-person perks comprise a rate discount, a reward point bonus, a bonus deposit, low fees associated with the new financial account, eliminated fees associated with the new financial account, or combinations thereof.

9. The system of claim 1, wherein the second instructions are further configured to cause the server to direct the mobile user device display to render a non-personalized product page or section of a software application associated with the product in response to determining that the verification request is not the first verification request or the verification request is not within the predetermined time threshold.

10. The system of claim 1, wherein the third instructions are further configured to cause the mobile user device to initiate a software application.

11. The system of claim 10, wherein scanning the machine-readable element is responsive to initiating the software application.

12. The system of claim 10, wherein the software application comprises a website that is associated with the product.

13. The system of claim 10, wherein prior to scanning the machine-readable element the software application authenticates the mobile user using one or more of a username and password, facial recognition and fingerprint recognition.

14. The system of claim 1, wherein the tracking identifier request further comprises location data obtained from the employee computing device.

15. The system of claim 14, wherein location data obtained from the employee computing device comprises one or more of global positioning satellite (GPS) data and internet protocol (IP) address data.

16. The system of claim 1, wherein the third instructions are further configured to cause the mobile user device to, further responsive to receiving in-person status credentials: transmit an acquisition request to the server, the acquisition request comprising the in-person status credentials.

17. The system of claim 16, wherein the acquisition request comprises the in-person status credentials.

18. The system of claim 17, wherein the second instructions are further configured to cause the server to: responsive to receiving the acquisition request comprising the in-person status credentials, reduce an amount of fraud processing to be performed by the server.

19. The system of claim 1, wherein the tracking identifier comprises an alphanumeric character string.

20. The system of claim 1, wherein the link comprises a uniform resource locator (URL).

* * * * *